US006617996B2

(12) United States Patent
Johansson et al.

(10) Patent No.: US 6,617,996 B2
(45) Date of Patent: Sep. 9, 2003

(54) GROUND PENETRATING RADAR WITH AUDIBLE OUTPUT

(75) Inventors: Bernth A. T. Johansson, Mala (SE);
Johan Gustaf Friborg, Vannasby (SE);
A. B. Marlene Bergstrom, Mala (SE)

(73) Assignee: Mala Geoscience AB, Mala (SE)

( * ) Notice: Subject to any disclaimer, the term of this patent is extended or adjusted under 35 U.S.C. 154(b) by 0 days.

(21) Appl. No.: 09/881,585

(22) Filed: Jun. 14, 2001

(65) Prior Publication Data

US 2002/0196177 A1 Dec. 26, 2002

(51) Int. Cl.⁷ .......................... G01S 13/88; G01S 13/04
(52) U.S. Cl. ...................... 342/22; 342/21; 342/27; 342/118; 342/175; 342/195; 367/87; 367/93; 367/99; 367/107; 367/116
(58) Field of Search ........................... 342/21, 22, 25, 342/59, 89, 90, 91, 92, 93, 94, 118, 128, 133, 134, 139–144, 146, 147, 175–186, 195, 27, 28, 192–197; 367/87–116

(56) References Cited

U.S. PATENT DOCUMENTS

| 4,234,941 A | * | 11/1980 | Welland et al. ............. 367/116 |
| 4,489,405 A | * | 12/1984 | Tendler ...................... 367/116 |
| 4,616,350 A | * | 10/1986 | Tendler ...................... 367/116 |
| 4,621,348 A | * | 11/1986 | Tendler ...................... 367/116 |
| 4,672,590 A | * | 6/1987 | Tendler ...................... 367/116 |
| 4,692,763 A | * | 9/1987 | Gregg, Jr. ..................... 342/28 |
| 4,870,687 A | * | 9/1989 | DeLeon ...................... 367/116 |
| 4,979,154 A | * | 12/1990 | Brodeur ...................... 367/116 |
| 5,341,346 A | * | 8/1994 | Youlton ...................... 367/116 |
| 5,724,313 A | * | 3/1998 | Burgess et al. ............. 367/116 |
| 5,900,833 A | * | 5/1999 | Sunlin et al. ................. 342/22 |
| 6,396,433 B1 | * | 5/2002 | Clodfelter .................... 342/22 |

* cited by examiner

Primary Examiner—Bernarr E. Gregory
(74) Attorney, Agent, or Firm—Faegre & Benson LLP

(57) ABSTRACT

A ground penetrating radar system including a processor for generating audible output signals having discrete frequency components representative of the depth of buried targets. The amplitude of the audible frequency components is representative of the size or mass of the target.

26 Claims, 7 Drawing Sheets

GROUND PENETRATING RADAR WITH AUDIBLE OUTPUT

BACKGROUND OF THE INVENTION

1. Field of the Invention

The invention relates to ground penetrating radar (GPR) systems, and more specifically to a new method for identification of buried objects and structures with the help of a GPR system.

2. Description of the Related Art

Unlike upward-looking radar used for air traffic control and meteorology, the antenna in a ground penetrating radar (GPR) is directed downwards into the ground. For example, GPR is used for geophysical applications such as mapping subsurface strata, locating toxic waste sites for remediation, detecting of unexploded subsurface ordinance and locating pipes and cables.

A GPR system comprises at least one transmitter that transmits an electromagnetic impulse, usually in the frequency range of 1 MHz to 10 GHz. The system also comprises at least one receiver that receives a reflected waveform. The length of the impulse is usually adjusted to match the desired frequency range. The desired impulse duration may be expressed approximately in nanoseconds (ns) as 1/f, where f is the centre frequency in Gigaherz (GHz). Therefore, a 1 GHz antenna is fed with an impulse of 1 ns duration, a 500 MHz antenna is fed with an impulse of 2 ns duration, and a 100 MHz antenna is fed with an impulse of 10 ns duration. Ideally, this gives the transmitted waves very broad frequency content, centred around the frequency f. In practice the transmitted pulse is between 1 and 2 cycles of the centre frequency. Therefore, GPR systems are sometimes referred to as "impulse" or "ultra wide band" ("UWB") radars.

Subsurface applications such as construction, utility locating, environmental remediation, and unexploded-ordnance detection have long sought safe, reliable, cost-effective methods for "seeing into the ground". The utility locating market suffers greatly from inadequate locating technologies that results in hundreds of millions of dollars in damage, delays, and lost revenue for locating companies and contractors every year, losses that could be significantly reduced if GPR could be made an standardised method in these applications.

A big advantage of GPR, compared with other locating technologies, is that it can detect non-metallic as well as metallic objects. One other significant advantage with GPR is that it is not dependent on a metallic target that is unbroken, it can detect a broken cable equally as well as an unbroken cable. Other technologies that are used for locating purposes lack the ability to locate non-metallic utilities and have problems locating electrically broken metallic (cables and pipes) utilities.

GPR is used, to a limited extent, today for utility locating. The reflected waveforms are filtered and processed to an image that are displayed on a laptop-computer or some other display device. These display devices often have very poor performance in outdoor daylight, where most of the fieldwork has to be done. An important reason why GPR has not been accepted as a standardised method is that these images are difficult to understand and thus need to be interpreted by a qualified person. If a person not skilled in the art of interpreting radar images makes interpretations, the failure rate becomes too high. For this reason radar surveys are usually performed by consulting companies with qualified personnel, such as geophysicists or specifically trained geologists. Even for the qualified experts the processing and interpretation of data from a GPR system is cumbersome and time-consuming. This makes the GPR technology too costly for broad use in the utility locating industry. There is thus a need for better methods for utility locating.

DETAILED DESCRIPTION

The following description of embodiments of this invention refers to the accompanying drawings. Where appropriate, the same reference numbers in different drawings refer to the same or similar elements.

This invention describes one way of making GPR a better method by adding the extra dimension of sound to the interpretation of radar data. The human ear has a dynamic range from, roughly, 30 to 110 dB in sound power. It also detects frequencies in the range from 20 to 20,000 Hz. It therefore is advantageous to use hearing, alone or as a complement, to a visible display, when such a display has proven to be unsatisfactory. Another detail to note is that since there is no standardised way of presenting radar data on a colour screen, most professional users use grey-scales. These grey-scales usually contain 32 shades, effectively limiting the dynamic range in the image to 5 bits or approximately 30 dB. This value is very limited in comparison to the ear's 80 dB in sound power plus the frequency response.

Hearing is used in many other instruments such as radioactive detectors, metal detectors etc. In these instruments the hearing it has proven to be a very effective sense in detecting anomalies in the received signals.

Overview of the Invention

Figure 1:
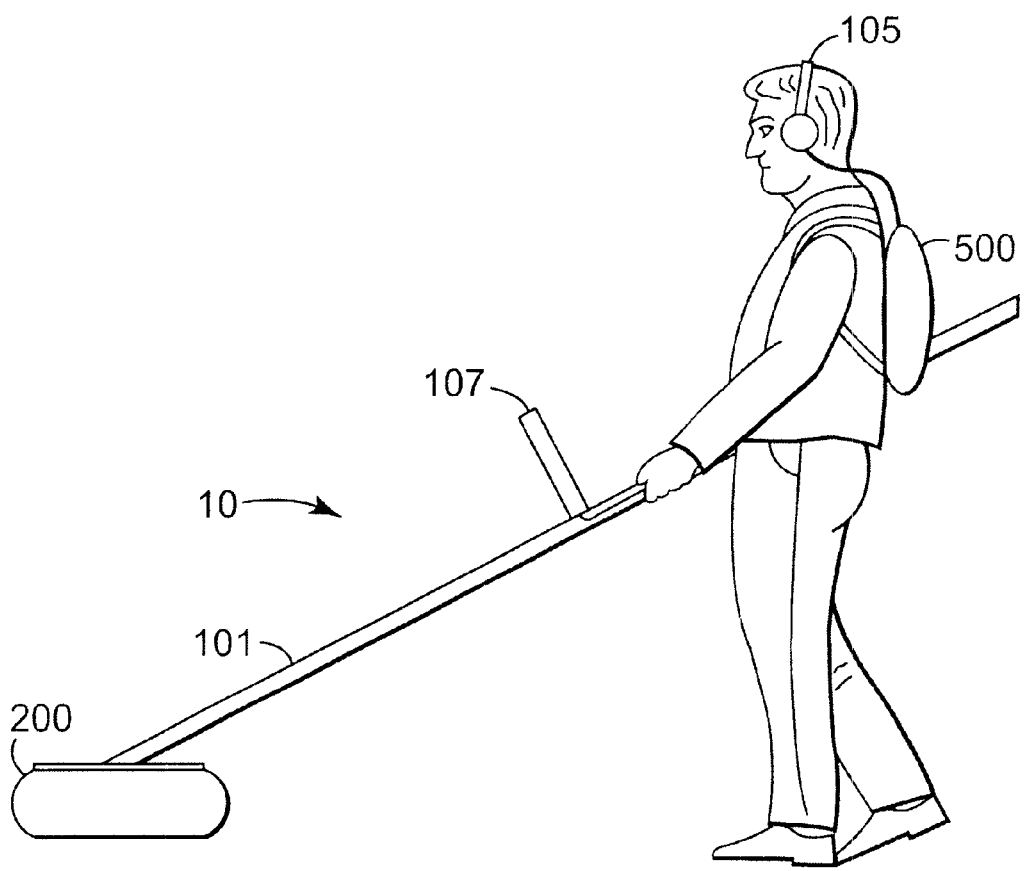
FIG. 1 is an illustration of a ground penetrating radar in accordance with the present invention being carried by an operator.

FIG. 1 is a diagram of a hand held GPR-radar system 10 in accordance with one embodiment of the present invention. A combined radar antenna 200 is attached to an arm 101 which is held by the operator. The combined antenna 200 comprises at least one receiver and one transmitter and electronics (not visible in FIG. 1) necessary for transmitting and sampling an impulse of electromagnetic energy. Another embodiment of the invention (not shown in FIG. 1) uses two pairs of antennas, oriented in two different polarisation axes. The sampled signal from the antennas 200 is fed to a processing device 500. In the processing device 500 the received radar signal is transformed to an audio frequency signal detectable by the human ear. This signal is fed to an audio transducer such as a set of headphones 105 carried by the operator. The processing device 500 can also produce a radar image that can be visually presented on a display device 107 mounted somewhere visible for the operator, for example, on the arm 101. Any known or otherwise conventional radar image display device can be incorporated in to the system 10 for this purpose. The operator will thus be able to use two senses (e.g., sight and sound) in his or her work when detecting the target.

During operation, the antenna 200 is moved from side to side while the operator moves forward. While moving ahead the operator will be able to judge from the sound produced by the system if a target is within the selected range.

Antenna Description

In one embodiment of the system 10, an antenna construction 200 is made of one transmitter and one receiver. This construction is sufficient when the targets are geologic formations such as layers and large cavities. This embodiment of the invention does not make use of any polarization effects from the targets.

Polarisation effects are most pronounced when linear targets such as metal pipes and cables are present. These effects occur, in general, when an electromagnetic wave is reflected from a linear target. When detecting these types of utilities, it is therefore advantageous to use an antenna and interpretation system which make use of these effects. An embodiment of one such combined antenna 200 is described below.

Figure 2C:
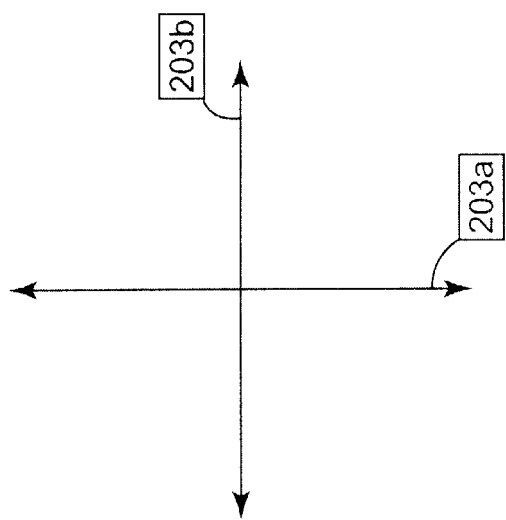
FIG. 2C is a diagrammatic illustration of the polarisation of the antenna described in connection with FIGS. 2A and 2B.
Figure 2A:
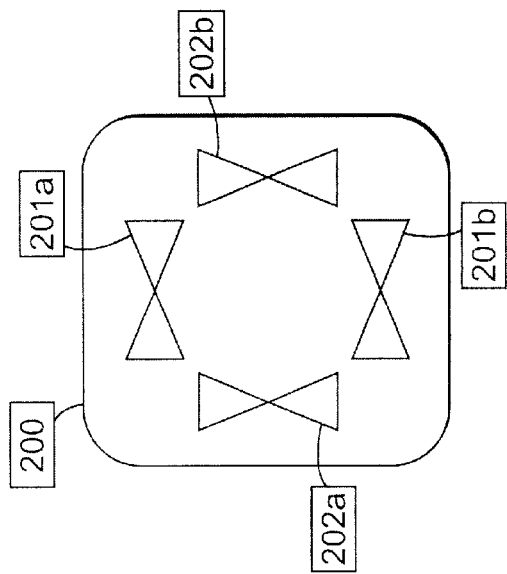
FIG. 2A is a schematic illustration of a bottom view of an antenna which can be incorporated into the system shown in FIG. 1.
Figure 2B:
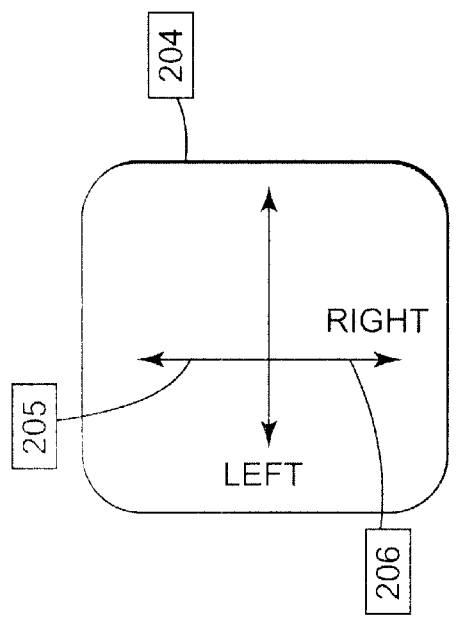
FIG. 2B is a schematic illustration of a top view of an antenna which can be incorporated into the system shown in FIG. 1.

FIGS. 2A and 2B are illustrations of a combined antenna 200 viewed from the bottom, and from the top, respectively. The antenna body 200 has four antenna elements 201*a*, 201*b*, 202*a*, 202*b*, mounted on the bottom surface, (the surface directed towards the ground during operation). The antenna pairs mounted parallel to each other function as a set of receiving and transmitting antennas, i.e. one channel. For example, in FIG. 2A, antenna elements 201*a* and 201*b* thus form one-pair/channel and antenna elements 202*a* and 202*b* forms another pair/channel.

Due to the linear polarisation produced by the antenna 200, the two channels described above will have different sensitivity to linear targets. This sensitivity is dependent on the target orientation with respect to the antenna polarisation symmetry. The antenna polarisation is shown as 203*a* and 203*b* in FIG. 2C (i.e., two axes spaced by 90°). For example, if two targets are present, the channel formed by the antenna elements 201*a* and 201*b* will give a much stronger signal from a target located along orientation 203*b* than the channel formed by antenna elements 202*a* and 202*b*. The radar signals from the two channels are preferably processed and transformed in the same way, as described later in this specification. That the processing on both channels are equal is an important point, since an operator can be mislead if the processing is unequal, and the operator is unaware of this mode of operation.

The resulting audio signals from the two channels are preferably fed to one ear each. By marking the top of the antenna 200 with the polarisation axis as well with the ear that each channel is fed to (right or left), an operator will be able to judge from the audio signals in which direction the target is laid down. One example of how the top of the combined antenna 200 could be painted is shown in FIG. 2B (indicia 205 and 206). Other indications of orientation between the antenna and resulting audio signal can also be used.

For example, if the operator scans an area and detects a signal in both ears, he or she will be able to judge from a characterisation of the signals (e.g., their strength) fed to each ear, whether the target is closer to the axis 206 labelled "Right" or whether it is closer to the axis 205 labelled "Left". Since the antenna 200, and the whole system 10, is lightweight and therefore easy to move, he or she will be able to point out the more precise layout of the targets by zooming in on one detection and investigating it from different positions.

Another embodiment of the invention (not shown) includes one antenna pair. For example, elements 201*a* and 201*b*, can be left out of the embodiment shown in FIGS. 2A and 2B, and the audio signal created from the response from antenna elements 202*a* and 202*b* fed to both right and left headphones 105, or a loudspeaker system (not shown). If this embodiment of antenna 200 is swept in a half circle as the operator moves forward, step by step, this simplified system will enable the detection of targets as well. However, the precise determination of the target layout is more cumbersome with this embodiment than that described above. In many cases the approximate direction of the targets are known, for example a sewer line buried along a street, and in such cases the more simple construction of the antenna works well.

Description of Radar Signals

Figure 3:
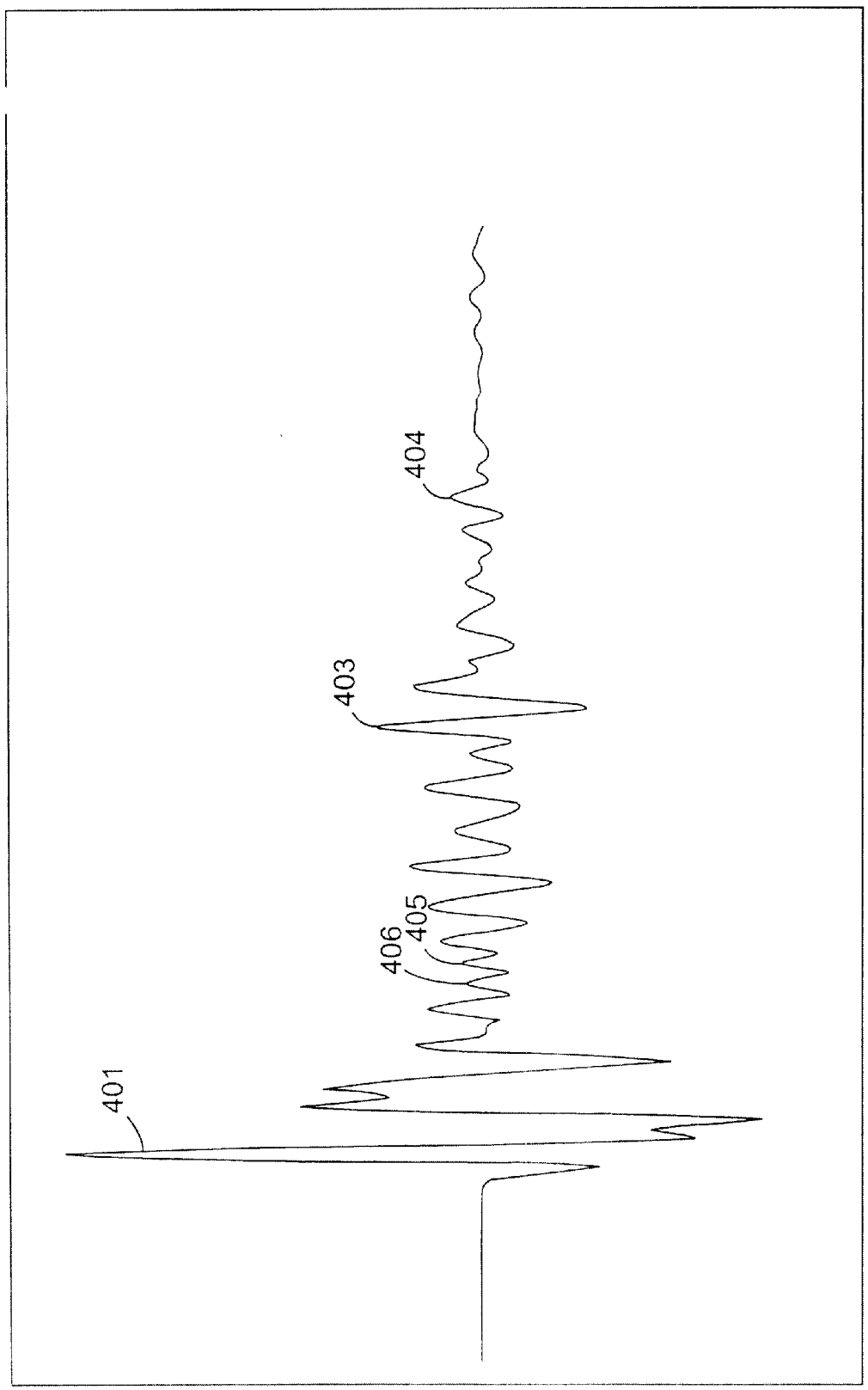
FIG. 3 is an illustration of a typical unprocessed radar signal.

In FIG. 3 a typical radar signal, unprocessed, is shown. A typical radar signal is characterised by several well-known attributes. Below the most important ones are described, with reference to FIG. 3:

First Arrival

There is always a first arrival 401 which, often, is of relatively low importance since it typically emanates from the energy travelling directly from the transmitting antenna elements to the receiving elements. In these situations the first arrival 401 has not been influenced by any targets and does not carry information representative of hidden objects. When the system 10 is operated at very close range to an object, this characteristic of the new arrival 401 is not entirely true since objects that are buried very shallow might interfere with the direct wave. Man-made utilities are usually buried deep enough so that the direct wave can be neglected in the search. The first arrival 401 is often used as a time-zero mark in the radar images.

Reflections

The amplitude of reflections such as 403 and 404 from buried objects relate to but may not directly correspond to the radar cross section of the target. This is due to the linear attenuation caused by the spreading of the transmitted energy onto a spherical surface and to the exponential attenuation caused by the conductivity of ground. A deep buried target with a large radar cross section might therefore show up in the radar signal as a much weaker anomaly than a shallow target with small radar cross section. However a shallower target will show a return earlier (more to the left in FIG. 3) than a deeper target.

According to the present invention, an absolute radar cross section is not determined for each return. The radar cross section could, however, be calculated if the effective attenuation of the ground is known. This would require that the observed amplitude be compared to the amplitude predicted for a wave traveling from the antenna to the reflecting object and back again.

The Time Duration

A radar signal is characterized by its very short time duration. This is due to the high speed of light (i.e., the signal speed) and the high frequency content of the electromagnetic waves used. In typical soils the propagation velocity of the electromagnetic waves is between 50–140 m/μsec. which gives a time window of interest in the range of 0–100 nsec., since most utilities are buried less than 2.5 m in depth. Since the time events are so short one cannot directly convert a radar signal to an audio signal. A conversion procedure is therefore implemented to allow the human ear to detect anomalies.

Clutter

Other attributes of a radar signal are the many, not target related, peaks in the waveform known as clutter. The clutter is caused by reflections from from stones and small objects as well as multiple reflections from objects. For example, an unskilled operator might interpret signal features 405 and 406 as reflections from buried objects.

A radar system produces radar signals, as shown in FIG. 3, with a very high speed. For example, 20–200 such waveforms are often produced every second. It is for these reasons that conversion procedures are implemented.

Description of Processing Scheme

To be able to use audio signals as detection tools together with radar, several processing steps can be carried out. The processing embodiment described below is done with the use of conventional algorithms described both in geophysical and electronic literature. Other processing approaches and algorithims can also be used.

Figure 4:
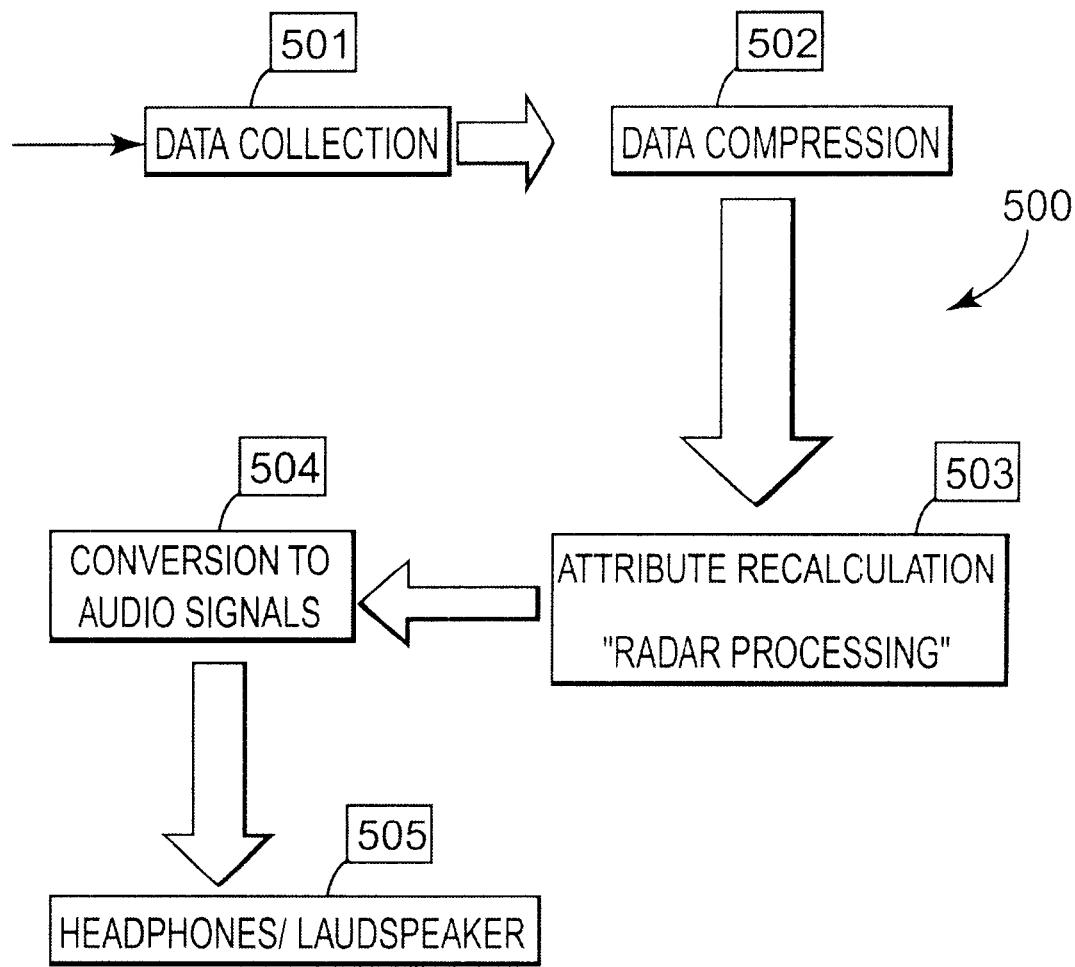
FIG. 4 is a block diagram of one embodiment of a processing system for implementing the present invention.

FIG. 4 is a block diagram of one preferred embodiment of the processing device 500. In the following description the processing device 500 is described as if it were made up of several separate units. However, the processing device 500 could also be implemented as single computer program, or as other combinations of units.

The first step (501) involves the gathering of data to manage the data stream coming from the antenna 200. This can involve storing a data buffer that can be transferred to the next step in the processing scheme, when appropriate.

Due to the high speed of a modem GPR instrument, a data compression algorithm is typically implemented. This can be done by a compression process at step 502. One approach to compression involves the selection, for example, of every $10^{th}$ envelope for further processing. A more advanced method of compression involves the selection of a certain number of envelopes and averaging these envelopes before transferring them to the next processing unit. The number of averages thus effectively determines the speed of envelope transfer.

From the earlier description of the radar signal attributes it is evident that a recalculation has to be performed in the process of building an audio signal. The recalculation procedure can be performed by an attribute recalculator (step 503). Since the preferred embodiment of the invention is directed to the utility locating industry, the targets of interest typically have a limited size, at least in one direction. Therefore a spatial band-pass filter can be added without loss of essential information, as long as the limits are kept within proper ranges. For example, a suitable pass band have been found to be between 3 m and 5 cm. This spatial band-pass filter also has the advantage of removing the uninteresting part of the first arrival 401 (FIG. 3) so that the remaining information can be used, if appropriate. A second filter implemented by the recalculator step 503 is a bandpass in the frequency domain, which effectively removes noise outside the radar frequencies of interest. A third filter implemented by the recalculator step 503 provides the signal compensation for the linear and exponential attenuation described earlier.

Figure 5:
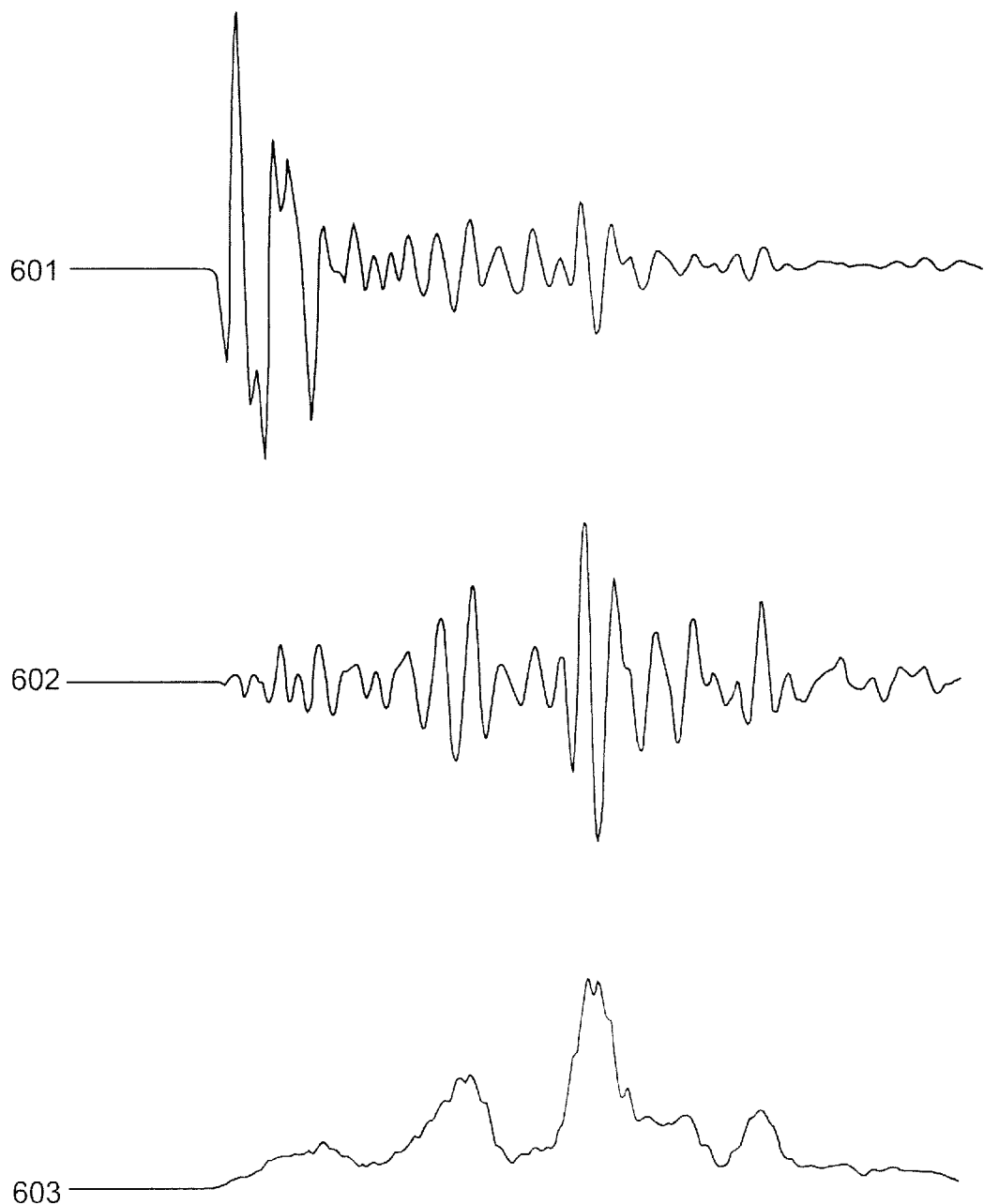
FIG. 5 is an illustration of examples of waveforms of signals at various locations in the processing system shown in FIG. 4.

FIG. 5 includes an illustration of an unprocessed waveform 601. The effect of applying the three filtering algorithms mentioned above to the waveform 601 is shown as waveform 602. Waveform 602 represents no great improvement, in terms of easiness to interpret, over the initial waveform 601. This type of processing scheme is commonly used and presented here as an example only. Other processing approaches which provide the attribute recalculation function can also be used.

In order to simplify for the operator the interpretation of signal 601, an envelope of the filtered waveform 602 is calculated or otherwise generated Integrating the filtered waveform 602 around each point is an efficient approach for generating the envelope. The following is a formula which expresses this operation.

$$R(t) = \int_{t-a}^{t+a} |f(t)| dt$$

Where R(t) is the value of the new envelope waveform 603 in each point of time t, and f(t) is the filtered waveform 602. +a and −a should be selected to cover approximately one waveform of the initial signal 601. Each point of the new waveform 603 is made up of the voltage-time area of the initial signal, over a specified time interval. The above described method of calculating an envelope waveform is only one of several ways of achieving the similar result. For example, other known approaches such as connecting the maximum points of the absolute values of the waveform in 602, would work as well.

The resulting envelope waveform 603 is shown in FIG. 5. Envelope 603 may lack the resolution of the initial radar signal (e.g., signal 601), but it is simpler to describe and to analyse. For example, many peaks are gone and broader peaks represent the reflections. This type of signal forms the basis of the conversion to an audio signal. More filtering can be introduced, but the one described should provide a complete understanding of the invention.

Transformation to Audio Signals

Figure 6:
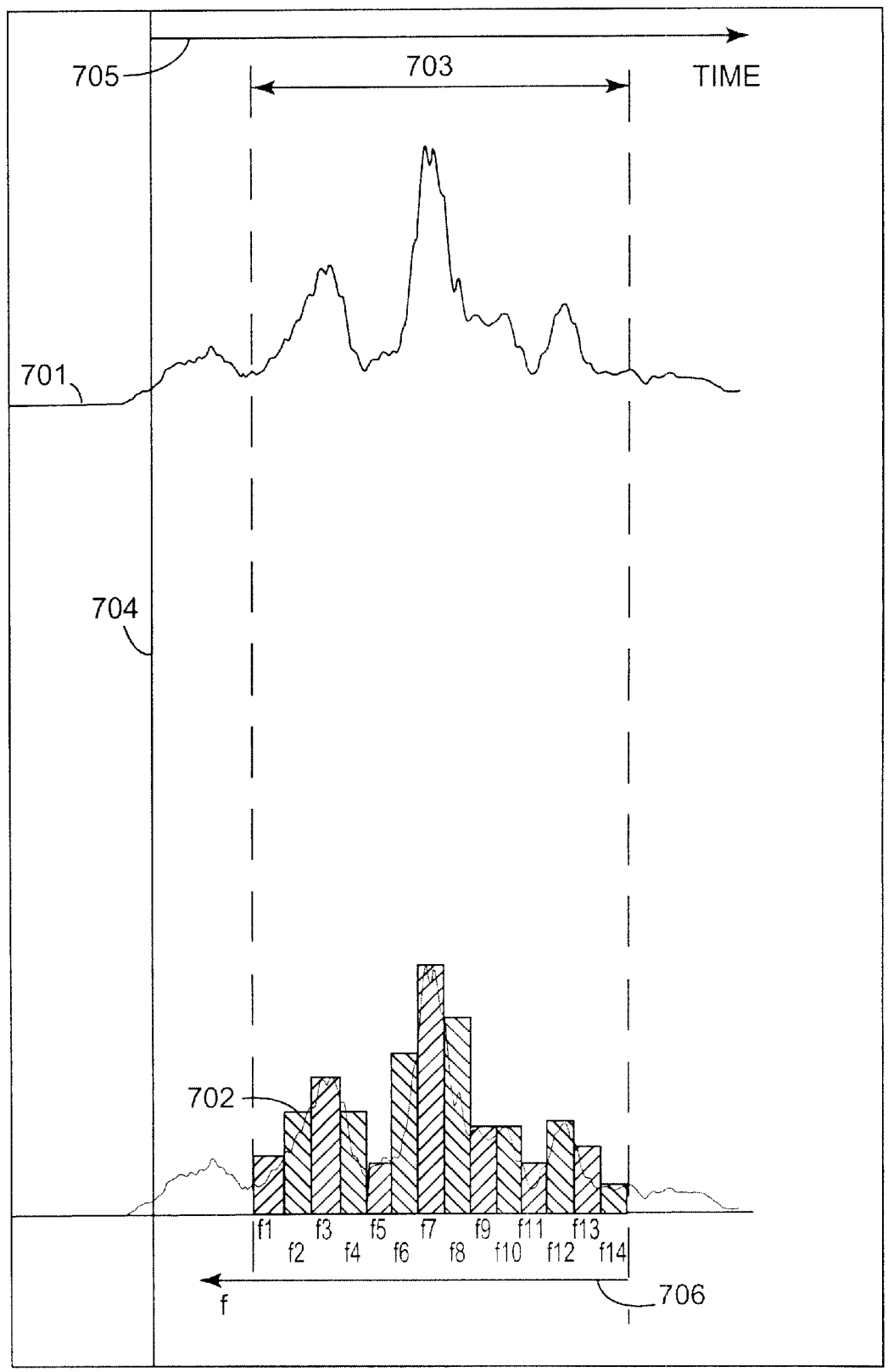
FIG. 6 is an illustration of the signal processing operation performed by the audio signal converter shown in FIG. 5.

It is desirable to represent the radar return signals as audio signals for the reasons noted above. Following the recalculation step 503 described above, the radar signal is converted to an audio signal by a conversion step 504. FIG. 6 illustrates the final envelope 701 from the processing system 500, together with a time zero-line 704, and a range gate 703. The audio signal can be created to be dependent upon the size and depth of the object being radiated by modifying the frequency or amplitude with the depth or size of the object.

Time scale 705 and a frequency scale 706 are also shown in FIG. 6. The time scale 705 corresponds to the processed radar signal 701 only, and the frequency scale 706 corresponds to the discrete frequencies, f1 ... f15, only. The starting-point of the time scale 705 is typically selected at the first arrival 401 described above in this document. The frequency scale 706 is shown in logarithmic form and is shown as starting at the end of the range gate 703 and increasing as the time-scale decreases. In this way shallow objects will be represented by higher frequencies than more deeply buried objects. This approach to mapping the audio frequencies has been found to be easier to interpret than alternatives such as letting both scales 705 and 706 start at the same point.

The range gate 703 is selected so that the time portion of the radar signal to be evaluated corresponds to the desired depth of investigation. The range gate 703 can be adjusted to cover different investigation depths, in which case the starting point of the frequency scale 706 will follow the end of the range gate. In the lower diagram of FIG. 6 staples of discrete audio frequencies 702 have been drawn over the initial envelope within the range of investigation, the range gate 703. This has been done for purposes of illustration and explanation only, as the two signals are of completely different character. The original signal 701 is a voltage-time signal and the audio frequencies 702 are discrete signals in the audio spectrum.

In the example shown in FIG. 6 the height of the staples of frequencies 702 corresponds to the maximum height of the envelope (701) within the staple. In general one would prefer to chose a linear or logarithmic adjustable relationship. The staple heights correspond to the output audio power, (e.g., the volume setting for the headphones). In general, the amplitudes of the audio signals at each frequency corresponds to the strength of the radar signal at that frequency. The strength of the radar signal is generally related to the size or mass of the target reflecting that portion of the radar signal. The discrete frequencies 702 can be selected so they are logarithmically decreasing with time. For example, if the audio frequency ranges is selected within 14 000 to 1000 Hz, $f_1$ can be chosen as 14 000 Hz, $f_2$ as 13 669, $f_3$ as 13 314, ... $f_{14}$ as 4328 Hz and $f_{15}$ 1000 Hz in one embodiment of the system 500. It is to be understood that the illustrated number of discrete audio frequencies 702 as well as the frequency span, the volume (audio power) and the range gate 703 are shown in FIG. 6 as examples only. The values of these parameters are adjustable in some embodiments of the system 500. The way that the sound power (volume) for each discrete audio frequency is calculated is also presented. Other approaches such as an integration algorithm or an average value over the width of each frequency staple would also provide a usable result.

Figure 7:
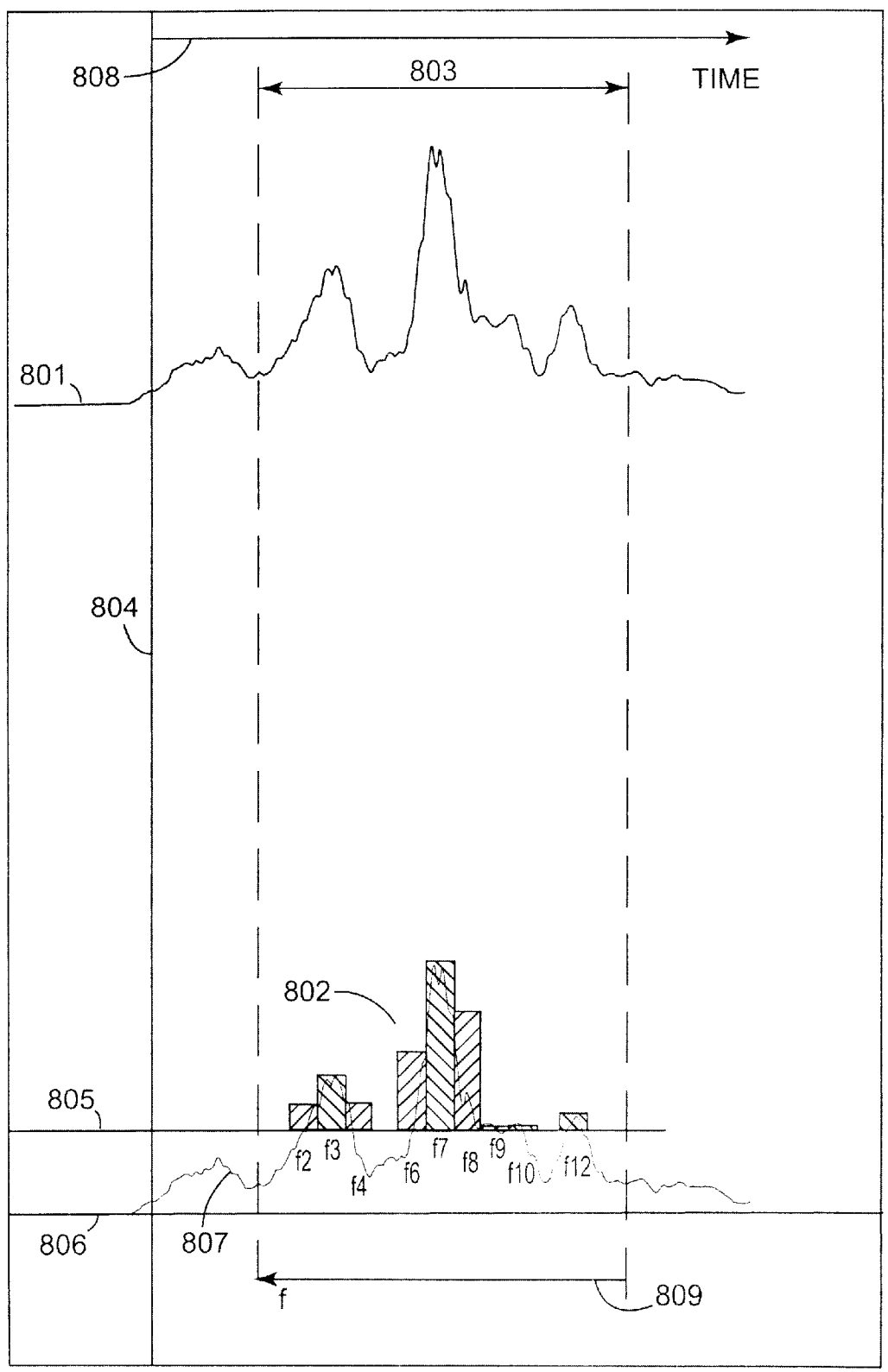
FIG. 7 is an illustration of an alternative signal processing operation which can be performed by the audio signal converter shown in FIG. 5.

FIG. 7 illustrates an alternative signal processing operation which can be performed by the audio signal converter (step 504 FIG. 4). As shown, this embodiment is similar to that shown in FIG. 6 except for the threshold level 805. The threshold level 805 is adjustable with respect to the zero amplitude level 806. This zero amplitude level 806 is also shown in FIG. 6 but not marked. All radar signals below the threshold level 805 are not represented by any audio signals and all parts of the radar signals with amplitudes that are higher than the threshold level are represented by discrete audio frequencies. The processed radar signal 807, which forms the basis of the conversion from radar to audio frequencies, is shown in FIG. 7 for purposes of describing the invention.

In the embodiment shown in FIG. 6, all frequencies 702 are represented in the audio output, which will give a background sound that will appear as noise. In the embodiment shown in FIG. 7 the peaks in the radar signal are mapped as peaks of audio frequencies, with intersecting missing frequencies. This can make the interpretation via the headphones or loudspeaker system easier. It is important to understand that in the illustrated embodiment, the audio frequencies are not moved because of intersecting "empty" periods.

The audio frequencies described above and shown in at 702 in FIG. 6 and 802 in FIG. 7 are examples of how the conversion is done, from radar signals to audio signals detectable for the human ear. For each pair of antennas/channel such a spectrum of audio signals is calculated and output to the headphones, continuously as the data arrives from the radar antennas. As the operator moves the antenna over the ground the sound will change according to how objects are buried. The conversion from radar signals to audio signals can be implemented in an optimised hardware for space/weight/speed reasons but if these issues are not of concern the conversion could also take place within a computer with an audio card and a dedicated computer program.

Although the present invention has been described with reference to preferred embodiments, those skilled in the art will recognize that changes can be made in form and detail without departing from the spirit and scope of the invention.

What is claimed is:

1. A processing system for use in a ground penetrating radar system of the type providing radar signals including information representative of buried targets, comprising:
    a first signal source for radiating a first signal into the ground;
    a first receiver for receiving a first return signal from the first signal;
    a second signal source for radiating a second signal into the ground;
    a second receiver for receiving a second return signal from the second signal; and
    a processor connected to the first and second receivers for producing a first audio signal as a function of the first return signal and a second audio signal as a function of the second return signal.

2. The processing system of claim 1, wherein the processor generates the first and second audio signals having frequencies representative of the depth of buried targets.

3. The processing system of claim 2, wherein the processor generates the first and second audio signals having amplitudes representative of the strength of the radar signal.

4. The processing system of claim 2, wherein the processor generates the first and second audio signals having amplitudes representative of the size of the buried targets.

5. The processing system of claim 1, wherein the processor generates the first and second audio signals having amplitudes representative of the strength of the radar signal.

6. The processing system of claim 1, wherein the processor system generates the first and second audio signals having amplitudes representative of the size of the buried targets.

7. The processing system of claim 1, wherein the processor is responsive to a radar signal including information representative of the orientation of buried targets, and generates first and second audio signals representative of the orientation of buried targets.

8. The processing system of claim 1, wherein the processor generates the first audio signal as representative of a first target orientation, and the second audio signal as representative of a second target orientation.

9. The processing system of claim 8, wherein the first and second target orientations are separated by about 90°.

10. The processing system of claim 8, further including a first transducer connected to receive the first audio signal, and a second transducer connected to receive the second audio signal.

11. The processing system of claim 1, further comprising an attribute recalculator.

12. The processing system of claim 11, wherein the attribute recatculator includes a time-domain band pass filter.

13. The processing system of claim 11, wherein the attribute recalculator includes a frequency-domain band pass filter.

14. The processing system of claim 11, wherein the attribute recalculator includes an attenuation compensation filter.

15. The processing system of claim 11, wherein the attribute recalculator includes a waveform envelope generator.

16. The processing system of claim 1, wherein the processing system includes a range gate for selecting the portion of the radar signal to be processed.

17. The processing system of claim 1, further comprising a threshold comparator for thresholding the first and second audio signals.

18. The processing system of claim 1, wherein the processor generates visual signals representative of the buried targets.

19. A ground penetrating radar system, comprising:
a receiver for receiving a first radar signal representative of buried targets at a first orientation, and a second radar signal representative of buried targets at a second orientation which is spaced about 90° from the first orientation; and
a processing system for converting the first radar signal into first audio signals having discrete frequencies representative of the depth of buried targets and amplitudes representative of the strength of the first radar signals, and second audio signals having discrete frequencies representative of the depth of buried targets and amplitudes representative of the strength of the second radar signals.

20. The invention of claim 19, wherein the processing system includes a range gate for selecting the portions of the first and second radar signals to be processed.

21. The invention of claim 20, wherein the processing system includes a threshold comparator for comparing the first and second audio signals to a threshold level, and for outputting only the portions of the first and second audio signals that exceed the threshold level.

22. The invention of claim 19, and further including a first transducer connected to receive the first audio signals, and a second transducer connected to receive the second audio signals.

23. A method of radar imaging objects encased within a medium, comprising the steps of:
radiating a first signal into the medium from a first position;
receiving a first return signal;
radiating a second signal into the medium from a first position;
receiving a second return signal;
processing the first return signal to produce a first audio signal having a signal characteristic representative of a distance of the object within the medium from the first position; and
processing the second return signal to produce a second audio signal having a signal characteristic representative of a depth of the object within the medium from the first position.

24. The method of claim 23, wherein the signal characteristic is to assign different audio frequencies dependent upon the depth.

25. The method of claim 23, wherein the second signal is radiated into the medium along an axis that is approximately 9° rotated from an axis of radiation of the first signal.

26. The method of claim 25, wherein the signal characteristic for both the first and second audio signals is different frequencies dependent upon the depth.

* * * * *

UNITED STATES PATENT AND TRADEMARK OFFICE
CERTIFICATE OF CORRECTION

PATENT NO.   : 6,617,996 B2                                             Page 1 of 1
DATED         : September 9, 2003
INVENTOR(S)  : Bernth A.T. Johansson et al.

It is certified that error appears in the above-identified patent and that said Letters Patent is hereby corrected as shown below:

Column 10,
Line 36, delete "9º" and insert therefor -- 90º --

Signed and Sealed this

Twenty-third Day of December, 2003

JAMES E. ROGAN
*Director of the United States Patent and Trademark Office*